United States Patent Office 3,520,640
Patented July 14, 1970

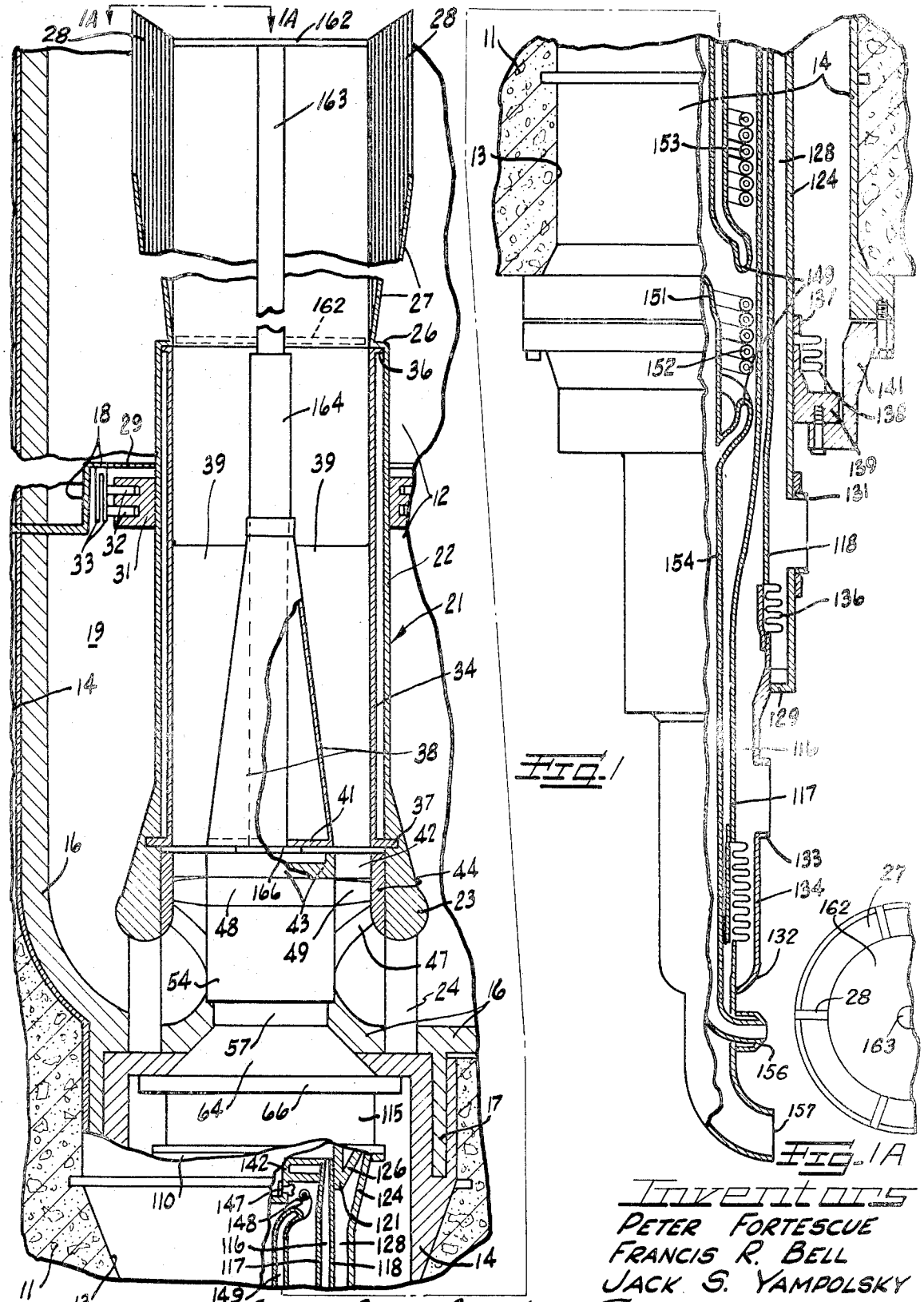

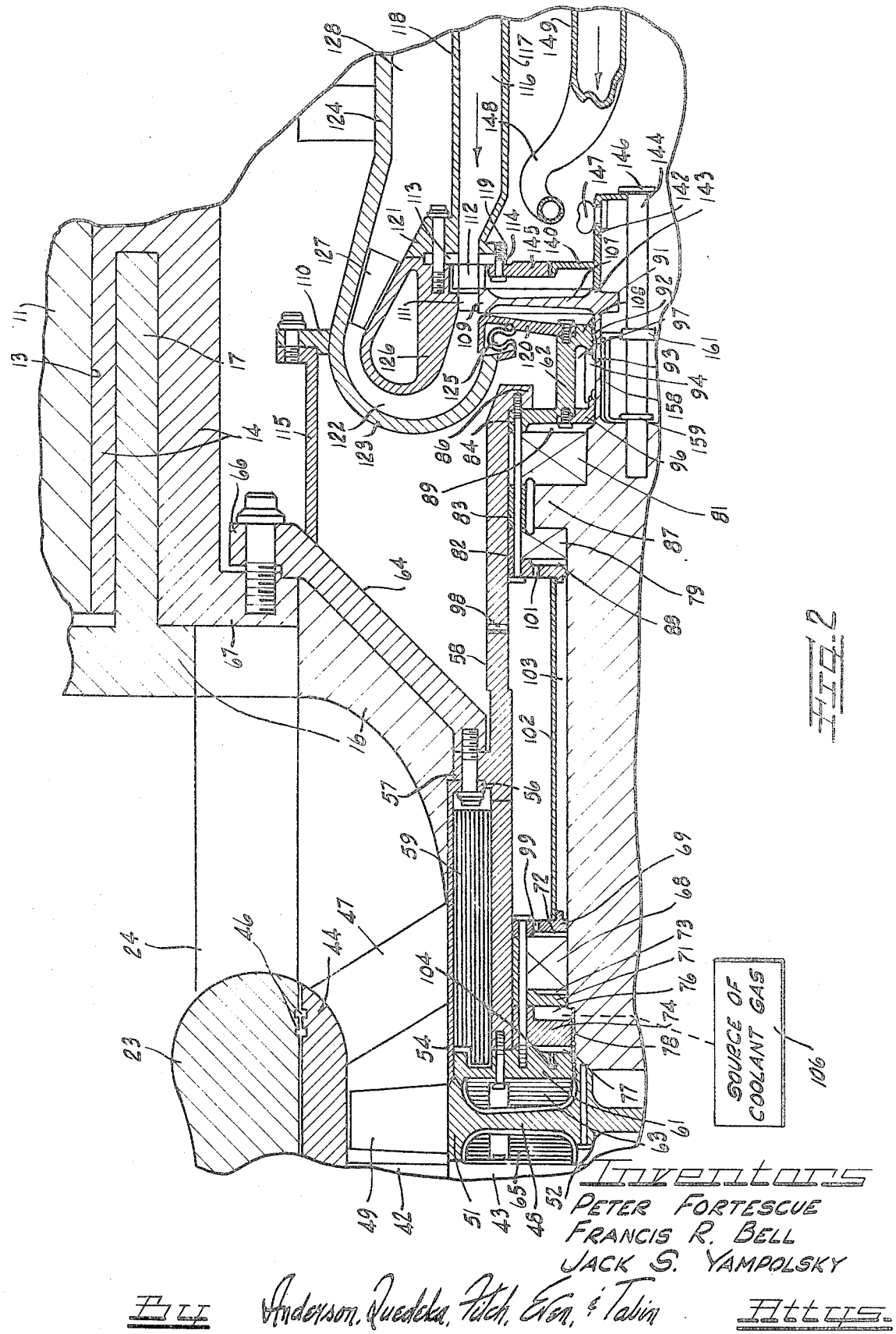

3,520,640
FLUID CIRCULATOR
Jack S. Yampolsky, Francis R. Bell, and Peter Fortescue, San Diego, Calif., assignors, by mesne assignments, to the United States of America as represented by the United States Atomic Energy Commission
Filed Sept. 6, 1966, Ser. No. 577,316
Int. Cl. F04d 13/02, 29/00
U.S. Cl. 417—360                 9 Claims

ABSTRACT OF THE DISCLOSURE

A fluid circulator is described incorporating rotary elements for establishing a fluid flow. A drive shaft rotates the rotary elements, and is driven by a first turbine portion and a second turbine portion, each of which is independently operable to rotate the drive shaft from separate sources of pressurized driving fluid.

---

This invention relates to fluid circulators and, more particularly, to an improved fluid circulator which may be used for circulating the coolant in a nuclear reactor system. The invention has particular application to nuclear reactor systems which include a reactor containment vessel enclosing a reactive core, and wherein the coolant circulator of the system is enclosed within the reactor vessel.

A fluid circulator often comprises some type of rotary device which is rotated to establish a fluid flow. The circulator provides sufficient pressure differential between two regions in the fluid flow path to maintain a desired rate of fluid flow. A nuclear reactor system may utilize one or more of such circulators for maintaining fluid coolant flow to transfer heat from the reactive core to a suitable heat absorbing device. The latter, in the case of a power reactor, may be steam generating equipment.

Under certain circumstances, it may be desirable to place the coolant circulators of a fluid cooled nuclear reactor within the reactor vessel containing the reactive core. One type of reactor system in which this placement is advantageous is in a gas cooled nuclear power reactor system wherein the entire primary portion of the system (including the reactive core, primary coolant circulators, steam generators and associated main primary coolant ducting) is enclosed within a singel reactor vessel. The fact that external main primary coolant ducts are eliminated by enclosing the entire primary portion of the system in the reactor vessel avoids the possibility of a sudden loss of coolant. Where the reactor vessel is constructed of prestressed concrete, the need for additional elaborate biological shielding for enclosing the steam generators and main primary coolant ducting is eliminated, since the reactor vessel itself performs this function. Where the gas circulator or circulators are placed within the reactor vessel, it is less expensive and difficult to provide adequate containment if no drive shafts or similar rotary elements for the circulators ore passed through the walls of the reactor vessel.

It is desirable that the coolant circulator or circulators in a reactor system be highly reliable to insure uninterrupted coolant flow. For such reliability, a circulator may be constructed to be capable of being driven by either of two separate and different sources of power. Where a circulator is to be placed within a reactor vessel, without passing rotary elements through the walls of the reactor vessel, it may be difficult and expensive to make the circulator capable of being driven by separate sources of power. It is also desirable that the circulator demonstrate an ability to satisfactorily follow the demands of the reactor coolant system by being controllable to suitably change speed when necessary. Further desirbale attributes are that the circulator be so constructed to facilitate repair, to avoid incompatibility problems between the separate sources of power, and to avoid leakage of bearing lubricant into either the primary coolant gas system or the driving system for the circulator. Although the foregoing problems pertain to nuclear reactor coolant systems, the same problems may exist in providing a satisfactory fluid circulator for other types of systems.

Accordingly, it is an object of this invention to provide an improved fluid circulator.

It is another object of the invention to provide an improved fluid circulator which may be placed within a containment vessel and which is capable of being driven by either of two separate power sources without passing rotary elements through the walls of the vessel.

Another object of the invention is to provide a coolant circulator which is efficient in operation and which is capable of being controlled to adequately follow the demands of a nuclear reactor system.

Still another object of the invention is to provide a fluid circulator which is simple of construction, reliable of operation, and which may be readily serviced.

A further object of the invention is to provide a coolant circulator for a nuclear power reactor system which is readily contained within a reactor vessel and wherein the likelihood of lubricant leakage into either the primary coolant system or the vapor generating system is minimized.

Other objects of the invention will be apparent to those skilled in the art from the following description taken in connection with the accompanying drawings wherein:

FIG. 1 is a displaced sectional view of a gas circulator constructed in accordance with the invention, and illustrating a portion of a reactor vessel in which the circulator may be mounted;

FIG. 1A is a broken out top view of a portion of the circulator of FIG. 1, taken along the line 1A—1A of FIG. 1; and FIG. 2 is an enlarged full section view, rotated 90°, of a portion of the gas circulator illustrated in FIG. 1.

Very generally, the invention provides a fluid circulator 21 which comprises rotary means 48 for establishing a fluid flow, a drive shaft 53 for the rotary means, and turbine means for rotating the drive shaft. All such parts may be placed within a containment vessel such as a nuclear reactor vessel. The turbine means include a first turbine portion 107, 111, 112, etc., and may include a second or auxiliary turbine portion 142, 147, 148, etc. Means 116, 149, etc., are provided for coupling the first turbine portion to a source of pressurized drive fluid and for coupling the second turbine portion to a different source of pressurized drive fluid. The fluid sources are external of the containment vessel and are independent of each other, e.g., steam and water. The first turbine portion and the second turbine portion are each designed to be capable of rotating and drive shaft independently of the other portion. Lubrication for the drive shaft may be provided by a fluid which is the same substance as a drive fluid or the circulated fluid. When mounted in a containment vessel penetration, the rotary parts of the circulator are removable as a unit for serviceability.

Referring now in greater detail to the drawings, the illustrated fluid circulator 21 of the invention is used for circulating coolant in a gas cooled nuclear power reactor. The reactor includes a reactor vessel 11 which forms a chamber 12 within which the gas coolant is confined. The gas coolant may be helium, carbon dioxide, or some other gas affording low chemical and nuclear interaction with the remaining elements of the reactor system. The reactor vessel may be of any suitable material, but in the illustrated embodiment, the reactor vessel is comprised of prestressed concrete. Such a structure affords both biological shielding and containment for the reactor which is not susceptible to sudden explosive failure.

The reactor vessel 11 is supported by means, not shown, such that one or more of the exterior surfaces of the reactor vessel are accessible. Penetrations may then be provided in such surfaces communicating with the chamber 12 for accommodating such things as instrumentation, control rods, refuelling apparatus, steam generating equipment, and gas coolant circulators. One of the penetrations for the latter is illustrated at 13. The reactor vessel 11 is provided with a stainless steel liner 14 in the chamber 12. The liner 14 is brought out through the penetration 13 and the exposed surface of the liner within the chamber 12 is covered with a suitable thermal insulation material 16. The insulation material is formed into an annular projection 17 extending into an accommodating recess in the liner 14 at the upper end of the penetration 13.

A reactive core, not illustrated, is mounted within the chamber 12. A system of ducts and baffles, also not illustrated, are provided within the chamber for directing a flow of coolant gas over and through the reactive core. The gas is heated by the core and is passed through steam generating equipment, also not shown, to produce steam. The steam may be utilized to operate turbines or similiar machinery for the generation of electricity. For reasons developed subsequently, it is preferred that the steam generating equipment include a reheater section through which steam in the steam-water system is recirculated for reheating after passing through an initial expansion stage in a turbine for electricity producing machinery.

In the illustrated reactor, a floor or baffle 18 extends transversely of the chamber 12 and is anchored and sealed to the reactor vessel 11 to form a plenum 19 between the lower floor and the lower end of the chamber 12. The unillustrated steam generating equipment discharges the coolant gas into the plenum 19 after removing heat therefrom. The plenum 19 constitutes a region of low pressure within the chamber 12 such that a continuous flow of coolant gas is established through the core and the steam generating equipment.

In order to move the coolant gas through suitable ducts from the plenum 19 to the inlet side of the core to circulate therethrough, one or more gas circulators are provided. One of the gas circulators is illustrated and is designed in accordance with the invention. The illustrated circulator 21 includes a housing which is adapted for mounting within the chamber 12. The housing is comprised of a cylindrical outer wall 22 having a lower annular portion 23 of increased thickness with a rounded lower edge. The cylindrical outer wall 22 is supported on five uniformly spaced struts 24 which extend from the liner 14 of the chamber 12 to the lower portion 23. An annular flange 26 extends inwardly from the top of the cylindrical outer wall 22 and a frustoconical discharge duct 27 extends upwardly therefrom for discharging coolant gas into the chamber 12 above the lower floor 18. Five uniformly spaced guide ribs 28 extend upwardly and inwardly from the discharge duct 27 for reasons which will be explained later in this specification.

The gas circulator 21, as previously mentioned, operates to collect the gas in the plenum 19 which is discharged thereinto from the steam generating equipment. The gas circulator compresses the collected gas and discharges it through the discharge duct 27 into the chamber 12 above the lower floor 18. An opening 29 is provided in the lower floor 18, and the cylindrical outer wall 22 of the gas circulator housing passes through the opening 29. A ring 31 extends outwardly from the cylindrical outer wall 22 just below the opening 29. The ring 31 carries a pair of annular seals 32 which project outwardly to engage the surface of a resilient bellows structure 33. The bellows structure is attached to the underside of the lower floor 18 and thus a seal is afforded at the opening 29 between the plenum 19 and the remainder of the chamber 12.

The gas circulator housing is further comprised of a cylindrical inner wall 34 which is concentric with the outer wall 22 and which forms a flow duct for receiving gas from the compressor section of the circulator, explained subsequently. The upper edge of the inner wall 34 carries an annular flange 36 which extends outwardly to mate against the underside of the flange 26 on the outer wall 22. The lower edge of the inner wall 34 is provided with an annular flange 37 which extends outwardly and is anchored in the widened portion 23 of the outer wall 22.

The interior of the circulator housing is provided with a central frustoconical section 38 which is suspended from the inner cylindrical wall 34 by means of four radially extending fins 39. The lower end of the middle section 38 is closed by a plate 41 having a central opening therein for supporting a pneumatic device, explained below.

The gas circulator 21 includes a compressor portion which collects the coolant gas in the plenum 19 and compresses it for discharge into the chamber 12 above the lower floor 18. The increase in pressure on the discharge side of the compressor portion thereby effects circulation of the gas in the previously described manner. The compressor portion of the gas circulator includes a stator section comprised of a plurality of stator blades 42 extending radially from a mounting disc 43. The ends of the stator blades 42 opposite the disc 43 are secured to a stator ring 44 which abuts the inner surface of the outer wall 22 at the portion 23 thereof. A pair of annular seals 46 (see FIG. 2) are provided between the ring 44 and the portion 23. The ring 44 is supported by five uniformly spaced struts 47, which extend from a bearing housing explained subsequently, and is rounded at its lower edge to continue the rounded surface of the portion 23.

The rotor section of the compressor portion of the gas circulator 21 includes a rotary disc 48 from which a plurality of rotor blades 49 extend radially. Referring to FIG. 2, it may be seen that the rotary disc 48 includes an annular flange 51 and a smaller concentric annular flange 52. The outer flange 51 carries the compressor blades 49 and the smaller flange 52 is bolted to the end of a drive shaft 53.

The drive shaft 53 is supported intermediate its ends by a bearing arrangement which is contained in a bearing housing. The bearing housing includes an upper cylindrical section 54 from which the struts 47 extend for supporting the stator ring 44. The upper section of the bearing housing is provided with an inwardly turned annular flange 56. The flange 56 is bolted to an annular shoulder 57 which extends outwardly from a lower cylindrical section 58 of the bearing housing. The lower cylindrical section 58 extends upwardly within the upper cylindrical section 54 and the space there between is filled with a suitable annular thermal insulation structure 59. This helps to protect the bearings contained within the bearing housing from the high temperature of the gas flowing into the compressor portion of the gas circulator 21. In the illustrated circulator, the insulation structure is comprised of multiple layers of metallic sheet separated by suitable webbing. However, other types of insulation may be used.

The bearings in which the drive shaft 53 is journalled are contained within the bearing housing and between upper and lower seal caps 61 and and 62, respectively. The outer edge of the seal cap 61 mates just within the end of the upper cylindrical section 54 and is bolted to the upper end of the lower cylindrical section 58. An annular ring of thermal insulation 63 is bolted to the seal cap 61 and a similar annular ring 65 is bolted to the stator plate 43 of the compressor. The insulation rings 65 and 63 are structured similarly to the insulation structure 59 and are shaped to fit adjacent the rotary disc 48 between the flanges 51 and 52 thereof. The thermal insulation rings help protect the bearings within the bearing housing from the high heat of the coolant gas within the compressor portion of the gas circulator 21.

The bearing housing is supported from the liner 14 of the chamber 12 within the reactor vessel 11 by means of a frustoconical support 64. The lower end of the support 64 includes an outwardly turned flange 66 which is bolted to an inwardly turned flange 67 of the liner. The upper end of the frustoconical support 64 is bolted to the shoulder 57 on the opposite side from the upper cylindrical section 54 of the bearing housing. Thus, the bearing housing is supported at the upper part of the penetration 13 from the liner 14. The thermal insulation 16 is brought out over the outer surface of the support 64 and along the outer surface of the bearing housing as far as the struts 47.

The bearings which support the drive shaft 53 in the bearing housing include a first journal bearing 68 near the upper end of the drive shaft. The journal bearing 68 is supported between a pair of bearing support rings 69 and 71, each of which extend from the inner surface of the cylindrical section 54 to the outer periphery of the drive shaft 63. The bearing support rings 69 and 71 are formed with recesses adjacent the bearing 68 to provide lubrication chambers 72 and 73. A spacer ring 74 is disposed between the bearing support rings 71 and the end seal cap 61. The bearing support rings 69 and 71, the journal bearing 68 and the spacer ring 74 are all bolted together against the seal cap 61. For purposes which will be subsequently explained, the spacer ring 74 is provided with an annular recess forming a chamber 76 between it and the bearing support ring 71. Similarly, the seal cap 61 is provided with an annular recess forming a chamber 77 between it and the spacer ring 74. Suitable labyrinth type seals 78 are provided between the spacer ring 74 and the drive shaft 53, and between the seal cap 61 and the drive shaft 53.

A second journal bearing 79 and a combination journal and thrust bearing 81 are provided toward the opposite end of the drive shaft 53 from the journal bearing 68. The journal bearing 79 is contained between an annular bearing support ring 82 and a spacing ring 83. The combination journal and thrust bearing 81 is contained between the spacer ring 83 and an outwardly extending annular flange 84 on the lower seal cap 62. The lower end of the cylindrical section 58 is provided with an inwardly turned annular flange 86. The flange 84, the bearing 81, the spacer ring 83, the bearing 79, and the support ring 83 are bolted as a unit to the flange 86. The downward thrust of the drive shaft 53 is transferred to the bearing 81 by means of an annular shoulder 87 on the drive shaft 53 which extends outwardly between the two bearings 79 and 81. The bearing support ring 82 extends from the cylindrical section 58 to the pheriphery of the drive shaft. An annular recess is provided in the support ring 82 to form a chamber 88 between the support ring and the bearing 79. Similarly, the seal cap 62 is provided with an annular recess adjacent the bearing 81 to form a chamber 89.

The sealing arrangement for the bearings and drive shaft, the function of which will be explained below, is completed at the lower end seal cap 62. The latter has an inwardly turned annular flange 91 and a suitable labyrinth type seal 92 is provided between such flange and the outer periphery of the drive shaft 53. It will be noted that at this point, the drive shaft 53 is continued by means of a downwardly extending hollow cylindrical portion 93. A spacer 94 is disposed surrounding the outer periphery of the cylindrical portion 93 of the drive shaft and is held in place between the flange 91 and a clamping ring 96, the latter being bolted to the seal cap 62. The function of the spacer 94 is to limit the thermal gradient imposed on the drive shaft. The seal cap is formed in such a way that a chamber 97 exists between it and the spacer 94.

In order to minimize problems of compatibility between various fluids used in the system, the bearings 68, 79 and 81 for the drive shaft 53 are lubricated with one of the two fluids associated with the gas compressor. In the illustrated embodiment, this fluid is water which is thereby fully compatible with the steam-water system used to drive the circulator, as will be explained in greater detail subsequently. The bearing type is hybrid, that is, the ability to support the shaft is provided by externally supplied hydrostatic pressure as well as by the hydrodynamic fluid film developed by rotation.

In order to conduct lubricating water to the bearings, a passage 98 is provided, in the cylindrical section 58, communicating with the space between the two bearing support rings 69 and 82. A further lubrication passage 99 is provided in the bearing support ring 69 communicating with the lubricant chamber 72. The lubricant chamber 72 communicates through the bearing 68 with the lubricant chamber 73. A passage 101 is provided in the bearing support ring 82 communicating with the lubricant chamber 88. Water is permitted to flow through the annular space between the shoulder 87 and the spacer ring 83 for lubricating the bearing 81, and such water will fill the lubricant chamber 89. Lubricant water may be conducted to the passage 98 by suitable tubes, not shown. A cylindrical shield 102 extends between the rings 69 and 82 to define an annular chamber 103 between the shield 102 and the drive shaft 53. The purpose of the chamber 103 is explained below.

In order to prevent lubricant from entering the primary coolant system, a gas purge is introduced, through a suitable passage 104 in the seal cap 61, into the chamber 77 between the labyrinth seals 78. The purge gas is supplied from a source 106, and is the same gas as the primary coolant, to be fully compatible therewith. It is introduced to the chamber 77 at a pressure which is substantially greater than the pressure of the primary coolant in the compressor. A pressure difference of 1 to 2 p.s.i. will be satisfactory in many instances. As a result of the introduction of gas to the chamber 77, a purge flow of gas will occur from the chamber 77 through each of the labyrinth seals 78. This prevents lubricant from passing the lower one of the labyrinth seals 78. Suitable drains, not shown, may be coupled to the chamber 76 for collecting the gas-lubricant mixture therein. The purge gas will also flow past the bearing 68 and the bearing support ring 69 and be collected in the chamber 103. Suitable drains (not illustrated) may also be provided for the chamber 103 to remove the mixture of gas and lubricant therein.

The gas circulator 21 is operable by either a steam turbine drive or a water turbine drive. The turbine portion of the circulator is at the lower end of the drive shaft 53. A rotor 107 for the steam turbine is drivingly secured to the cylindrical section 93 of the drive shaft by means of teeth on the lower edge of the cylindrical section which interlock with teeth on an annular ridge 108 on the rotor 107. The outer periphery of the rotor 107 is provided with a flange 109 upon which are mounted a plurality of radially extending steam turbine rotor blades 111. A plurality of stator blades 112 for the steam turbine are mounted by clamping rings 113 and 114 to extend across the mouth of an annular steam inlet passage 116. The inlet passage 116 is formed between a pair of concentric cylindrical conduits 117 and 118 which extend through the penetration 13 in the reactor vessel 11 to the exterior thereof. Flanges 119 and 121 are provided at the upper ends of the conduits 117 and 118, respectively, to provide a surface against which the rings 113 and 114 may be bolted.

After passing the blades 112 and the rotor blades 111, steam from the inlet passage 116 enters a collection chamber 122. The ring 126 is attached to the conduit 124 by is formed by an inwardly turned and rounded end portion 123 of a cylindrical steam conduit 124. An annular flange 110 extends outwardly from the end portion 123 and is bolted to a cylindrical support 115 which extends downwardly from the frustoconical support 64. The inner edge of the portion 123 is attached to an annular steam shield 120 by a suitable expansion joint 125 to allow for thermal expansion. The shield 120 is bolted to the seal cap 62 and extends outwardly therefrom.

A tubular ring 126 forms the inner wall of the chamber 122 and the outer surface of the ring 126 is shaped to provide the desired volume and contour for the chamber 122. The ring 126 is attache dto the conduit 124 by a plurality of fins 127 and is also bolted to the end of the conduit 128 such that the ring 113 is held between the flange 121 and the ring 126. The space between the conduits 118 and 124 constitutes the outlet passage for the steam after it has passed through the steam turbine.

As previously mentioned, the conduits 117 and 118 are brought out of the reactor vessel 11 through the penetration 13. Similarly, the conduit 124 is also brought out through the penetration. The lower end of the passage 128 is closed by a barrier 129. An orifice 131 communicates with the passage 128 in order to provide an outlet for steam from the return passage. The lower end of the passage 116 is closed by a barrier 132, and a suitable orifice 133 communicates with the passage 116 to permit the introduction of inlet steam into the passage. Thermal expansion of the conduit 117 is allowed for by a bellows section 134 and a similar bellows section 136 is provided for the conduit 118. The conduit 124 has an annular collar 137 thereon to which one end of a bellows section 138 is secured. The opposite end of the bellows section 138 is secured to a mounting ring 139 which slidably engages the periphery of the conduit 124. The mounting ring 139 is mounted to a connecting ring 141 which, in turn, is bolted to the lower edge of the liner 14 of the penetration 13. Thus, the lower end of the conduit 124 is secured to the liner 14 and hence to the reactor vessel 11, but thermal expansion of the conduit 124 with respect to the liner is permitted by the bellows section 138.

Returning to FIG. 2, the turbine portion of the gas circulator 21 includes a water turbine. The water turbine is for emergency drive, as is explained more fully subsequently, and includes a support cup 142 which is secured by interlocking teeth at its open edge to an annular raised ridge 143 on the rotor wheel 107. The closed end of the cup 142 is provided with an opening through which a spine 144 passes. The spine 144 is coaxial with and secured to the drive shaft 53 and is attached to the cup 142 by an end cap 146. Thus the cup and the spine will turn as a unit. A splash guard 140 extends outward radially from the cup 142. A splash ring 145 is bolted to the flange 119 on the end of the conduit 117 and extends inwardly to meet the splash guard. Some water or steam leakage between the outer edge of the guard 140 and the inner edge of the ring 145 is tolerable, since the steam turbine and the water turbine do not operate simultaneously.

A plurality of water turbine blades 147 are supported by the cup 142 and extend radially therefrom. The water turbine blades 147 are driven by a stream of water issuing from a nozzle section 148 in a water inlet tube 149. A nozzle similar to the nozzle 148 is disposed on the opposite side of the cup 142 to provide a second driving jet of water impinging upon the blades 147. The water for the second nozzle is supplied through a tube 151, illustrated in FIG. 1. After impinging on the blades 147, the water discharged from the nozzles is carried back out through the penetration 13 by the conduit 117.

In order to permit thermal expansion of the various elements in the penetration 13 without damaging the tubes 149 and 151, the latter are provided with coiled sections, 152 and 153, respectively. The tube 149 and the tube 151 branch off a main water inlet tube 154 near the lower end of the penetration. The tubes 154, 149 and 151 and the coiled sections 152 and 153 of the latter two tubes, are all contained within the conduit 117. The two coiled sections 152 and 153 are axially aligned, and a portion of the tube 149 passes through the coiled section 153 and a portion of the tube 151 passes through the coiled section 152. An orifice 156 communicates with the lower end of the tube 154 for supplying water thereto under pressure from a suitable source which will be explained subsequently. An orifice 157 is provided at the lower end of the conduit 117 communicating with the interior thereof to permit water returning from the water turbine to be discharged from the conduit.

During operation of the gas circulator 21, the temperature of the steam in the steam turbine may be of the order of 400° F., whereas the temperature of the lubricant water may be only about 100° F. This substantial difference may cause excessive thermal stresses in those parts of the apparatus which are in close proximity to both lubricant and steam. In the illustrated apparatus, the chamber 97 provides a buffer zone along the drive shaft between the steam and lubricant regions to avoid excessive thermal stresses in the drive shaft. To do this, the spacer 94 between the ring 96 and the outer periphery of the drive shaft is so constructed to permit water from the chamber 89 to bleed past the seal and into the chamber 97. Steam inleak into such chamber will occur through the labyrinth seal 92. The amount of water bleed is selected to be sufficient to condense any steam leaking into the chamber 97. This removes heat from the surrounding elements and the drive shaft and provides a buffer zone along the drive shaft which produces a longer region of transitional temperatures from the steam region to the water region. Condensation of steam inside the drive shaft cylinder portion 93, which might cause a leak of water back into the steam turbine region, is prevented by a thermal shield 158. The shield is in the form of a cup which fits over the spine 144 and by a collar 159. The shield closes the space between a collar 161 on the spine 144 and the cylindrical portion 93.

Returning now to FIG. 1, it may be seen that the circulator 21 is provided with a valve at its discharge side to prevent back flow of coolant gas through the circulator when the circulator is not in operation. The valve is comprised of a disc 162 which is attached to the end of a valve stem 163 and which is guided by the four ribs 28. The stem is shown in FIG. 1 in its fully extended position and it is to be noted that the stem is slidably mounted in a pneumatic device 164. The device 164 may comprise a pneumatically operable piston secured to the valve stem 163 and movable in a cylinder to which suitable pneumatic control lines have been attached. The latter items are not illustarted and it is to be understood that the valve stem 163 may be operable by any suitable mechanism. The device 164 is mounted at its lower end by a flange 166 to the underside of the plate 41. When the gas circulator is operating, the device 164 may be actuated to extend the valve stem to the position shown in FIG. 1 such that the coolant gas may pass out of the duct 27. When the circulator is stopped, the valve stem 163 is drawn into the housing 164 such that the plate 162 is flush with the top of the housing and extends to the inner surface of the cylindrical duct 34. This will cut off a substantial amount of the passage area for the gas and will thereby inhibit back flow of coolant gas through the circulator. If desired, the device 164 may be so constructed that, with the circulator operating, the pressure of the gas in the ducts 34 and 27 is sufficient to push the plate out a distance which will permit satisfactory discharge of the gas into the area above the lower floor 18.

Quantitative operational details of the gas circulator of the invention may best be understood with reference to specific examples of operating characteristics. A reactor system may be postulated using helium as the coolant and wherein normal full load operation of the gas circulator would require a flow rate of helium of approximately 874,000 pounds per hour. The temperature of the helium may be approximately 750° F., with the inlet temperature being slightly lower than the outlet temperature. With a circulator outlet pressure of approximately 700 p.s.i.a. the postulated system may require the circulator to increase the inlet pressure by approximately 15 p.s.i.a.

To fulfill the requirements of the postulated system, it is preferred that the steam turbine of the circulator be coupled in series with the reheat steam from the exhaust of the high pressure initial stage of the main electrical generating turbines. Steam from the exhaust of the circulator turbine flows to the reheater of the steam generating equipment. This will adequately supply power requirements for full load operating conditions, which may typically be expected to require a steam flow rate of 560,000 pounds per hour at an inlet temperature of about 740° F. and an outlet temperature of about 675° F. Steam inlet pressure may be almost 870° p.s.i.a., whereas the outlet pressure may be about 645 p.s.i.a. A small percentage of the steam flow may bypass the turbine at full load in order to provide a control margin. A suitable steam throttle and bypass valve, not illustrated, may be provided for controlling the speed of the circulator in accordance with the demands of the system. Thus, if the circulator is to operate at one-quarter of the full load with the helium pressure at the discharge end of the circulator being approximately 600 p.s.i.a, the throttle and bypass valves may be easily adjusted to the necessary level. For safety purpose, auxiliary steam supply systems may be provided.

Under certain accident conditions in a nuclear reactor, it may be necessary to operate a gas circulator notwithstanding the fact that steam is not available for driving the circulator through its steam turbine. The water turbine, previously described, affords a completely separate and auxiliary drive system which, like the steam turbine drive, may be fully contained within the reactor vessel in a manner such that no rotary elements are carried out of the penetration. Water to drive the water turbine may be obtained from an emergency feedwater system for the steam generating equipment, or may be obtained from another source of pressurized water, such as fire protection water. Although the water supply used may be insufficient to drive the turbine at full load power, some cooling will be afforded and this may be sufficient to adequately remove the reactor heat during shut down conditions, such as after a scram. For example, the steam turbine horsepower produced at full load operation may exceed 6,000, whereas a satisfactory horsepower rating for the water turbine may be the order of 400. The operating speed of the circulator may be between 9,000 and 10,000 r.p.m. for the postulated system.

The foregoing operating characteristics of the circulator may reasonably be expected to fulfill the requirements of the postulated system. Such characteristics have been approximated by utilizing a circulator having a drive shaft of 38 inches length, a gas compressor blade tip diameter of 27.6 inches, a steam turbine blade tip diameter of 17 inches and a water turbine blade tip diameter of 6.5 inches. The foregoing postulated reactor system requirements and circulator operating characteristics are given merely for the purposes of illustration and it is not intended that the scope of the invention be limited to such figures.

In the event that it becomes necessary to remove the moving parts of the circulator 21 to effect repair or replacement thereto, the design of the circulator of the invention is such as to readily facilitate this task. In particular, the rotary portion of the gas compressor, the drive shaft and its supporting elements and the turbine portion of the circulator are removable as a unit and may be passed through the penetration 13 to a position exteriorly of the reactor vessel 11. Removal is accomplished by detaching the frustoconical support section 64, at its flange 66, from the flange 67 of the liner 14. The mounting ring 141 outside of the penetration 13 is then detached from the liner 14. This then permits the compressor rotor 48, the ring 44, the drive shaft 53, and all the supporting elements thereof and the other elements of the circulator 21 below the rotor 48 to be withdrawn downwardly through the penetration 13. The removed parts of the circulator may be replaced by reversing the foregoing procedure.

It may therefore be seen that the invention provides an efficient gas circulator of axial flow design which may be operated by reheater steam and which may be made to readily follow the demand of the reactor system. The general construction is simple and reliable in operation, and incorporates an emergency or auxiliary drive system which is capable of utilizing a variety of power sources. Excellent containment integrity of the reactor vessel is easily achieved, since the moving portions of the circulator are all within the reactor vessel and no rotary elements extend through the penetration therein. The moving parts are readily removable as a unit through the penetration for facilitating serviceability. The likelihood of contamination by intermixing of the lubricant and the steam-water drive system is lessened by utilizing water lubricant, which is compatible with the steam-water system. Any contamination of the primary coolant system by the water lubricant is avoided by the utilization of a gas purge sealing system.

The invention may be utilized in connection with circulators for circulating fluid coolants other than gas, such as water or liquid sodium. In such instances, the lubricating fluid and the driving fluid or fluids may be selected in accordance with the compatibility considerations developed in the description of the illustrated device. For example, the fluid coolant may be water, the driving fluid steam, the auxiliary driving fluid water, the lubricant water and the purge fluid steam. A reactor system in which liquid sodium is used as the coolant may utilize a circulator using liquid sodium for all driving and lubricating and purge functions. Alternatively, such a system may utilize mercury vapor for a drive fluid, liquid mercury as a lubricant and liquid sodium as a purge fluid. The circulator of the invention may be used to advantage in other applications, such as a steam generator feedwater pump, wherein the problems are similar to those connected with coolant circulation.

Various other embodiments of the invention will be apparent to those skilled in the art from the foregoing description and accompanying drawings. Such other embodiments, and modifications thereof, are intended to fall within the scope of the appended claims.

What is claimed is:

1. A fluid circulator comprising rotary means for establishing a fluid flow, a drive shaft for said rotary means, and turbine means for rotating said drive shaft, said turbine means including a first forward driving turbine portion and a second forward driving turbine portion, said turbine means further including means for coupling said first turbine portion to a source of pressurized driving fluid and for coupling said second turbine portion to a different source of pressurized driving fluid, each of said first turbine portion and said second turbine portion being capable of rotating said drive shaft to produce the fluid flow independently of the other portion.

2. A fluid circulator in accordance with claim 1 wherein said rotary means are adapted for mounting in a housing disposed within a reactor vessel, and wherein said first turbine coupling means and said second turbine coupling means are elongated for communicating between the interior and exterior of the reactor vessel through a penetration therein.

3. A circulator in accordance with claim 2, wherein said second turbine portion is adapted to be driven by a liquid substance, wherein said first turbine portion is adapted to be driven by a vapor of the same substance, and wherein said circulator includes bearing means supporting said drive shaft and adapted to be lubricated by a liquid of the same substance.

4. A fluid circulator comprising rotary means for establishing a flow of a circulating fluid, a drive shaft for said rotary means, bearing means supporting said drive shaft, turbine means for rotating said drive shaft, means for coupling said turbine means to a source of pressurized driving vapor, means for lubricating said bearing means with a liquid of the same substance as said driving vapor, means defining a condensation chamber between said bearing means and said turbine means, and means for permitting a flow of the lubricating liquid from said bearing means into said condensation chamber sufficient to condense vapor leaking thereinto from said turbine means, thereby affording a limitation on thermal stresses in said drive shaft.

5. A fluid circulator comprising rotary means for establishing a flow of a circulating fluid, a drive shaft for said rotary means, bearing means supporting said drive shaft, turbine means for rotating said drive shaft, means for coupling said turbine means to a source of pressurized driving vapor, means for lubricating said bearing means with a fluid of the same substance as one of said circulating fluid and said driving fluid, a pair of spaced labyrinth seals positioned on said drive shaft between said bearing means and said rotary means, and means for introducing a fluid which is the same substance as one of the driving fluid and the circulating fluid to the space between said labyrinth seals at a pressure substantially higher than the pressure of the circulating fluid in said rotary means.

6. A circulator in accordance with claim 5 wherein said rotary means are adapted to circulate a gas, wherein said turbine means include a steam turbine, and wherein said bearing means are adapted for water lubrication.

7. A fluid circulator comprising rotary means for establishing a fluid flow, a duct adjacent said rotary means for receiving coolant circulated thereby, and a valve disposed in said duct for inhibiting back flow of fluid through said circulator said said rotary means are stopped, said valve comprising a disc substantially conforming with the cross section of said duct, a valve stem having a first end secured to said disc and a second end, and a pneumatically actuable device coupled to said second end of said stem for axially moving same between a close position at which said disc blocks said duct and an open position at which said disc is displaced from said duct sufficiently to permit a substantial fluid flow therethrough.

8. A circulator in accorance with claim 7, wherein said disc is movable in a direction substantially perpendicular to the surface thereof, and wherein said pneumatically actuable device permits the pressure of fluid entering said duct to maintain said disc in an open position.

9. A fluid circulator according to claim 1 including a housing adapted for mounting within a containment vessel, and stator means positioned adjacent said rotary means for coopreating therewith in the production of fluid flow, said rotary means, said stator means, said drive shaft and said turbine means being detachable as a unit from said housing and being of a size which permits removal of said unit through a penetration in the containment vessel.

References Cited

UNITED STATES PATENTS

| | | | |
|---|---|---|---|
| 1,487,828 | 3/1924 | Ziganek et al. | 98—116 |
| 2,153,576 | 4/1939 | Kurth et al. | |
| 2,929,548 | 3/1960 | Crooks et al. | |
| 3,069,134 | 12/1962 | Marque | 60—102 |
| 3,150,820 | 9/1964 | Jekat et al. | 103—111.33 |

FOREIGN PATENTS

| | | |
|---|---|---|
| 519,058 | 2/1931 | Germany. |
| 648,910 | 8/1937 | Germany. |
| 84,361 | 8/1954 | Normay. |
| 99,998 | 10/1940 | Sweden. |

HENRY F. RADUAZO, Primary Examiner

U.S. Cl. X.R.

417—405